United States Patent [19]

Taylor

[11] Patent Number: 4,731,025
[45] Date of Patent: Mar. 15, 1988

[54] TIME TEACHING DEVICE

[76] Inventor: Frank J. Taylor, 1132 N. Paseo DeGolf, Green Valley, Ariz. 85614

[21] Appl. No.: 886,609

[22] Filed: Jul. 18, 1986

[51] Int. Cl.⁴ .............................................. G09B 19/12
[52] U.S. Cl. .................................................. 434/304
[58] Field of Search ........................ 434/204, 304, 198

[56] References Cited

U.S. PATENT DOCUMENTS

| | | | |
|---|---|---|---|
| 3,022,582 | 2/1962 | Pitt | 434/304 |
| 3,203,115 | 8/1965 | Friday | 434/304 |
| 3,364,599 | 1/1968 | Polsky | 434/304 |
| 3,696,531 | 10/1972 | Stewart | 434/198 |
| 3,735,500 | 5/1973 | Matsumoto | 434/342 |
| 4,015,346 | 4/1977 | Ogasawara | 434/304 |
| 4,102,060 | 7/1978 | Berry | 434/304 |

FOREIGN PATENT DOCUMENTS

| | | | |
|---|---|---|---|
| 598965 | 12/1925 | France | 434/304 |
| 1030464 | 5/1966 | United Kingdom | 434/304 |

*Primary Examiner*—John E. Murtagh
*Assistant Examiner*—Andrew Joseph Rudy
*Attorney, Agent, or Firm*—CTC & Associates

[57] ABSTRACT

This invention deals with a teaching means for reading time by providing simulated analogue and digital clocks wherein said clocks function independently from each other.

1 Claim, 4 Drawing Figures

TIME TEACHING DEVICE

This invention deals with an educational time teaching device which carries simulated conventional analogue and digital clocks wherein the hands of the analogue clock and the numbers of the digital clock are changeable independently from each other.

BACKGROUND OF THE INVENTION

Numerous means of teaching the manner in which a clock indicates time have been formulated as for instance disclosed by the following references of interest:

U.S. Pat. No. 3,203,115 (Friday) is concerned with a toy educational clock comprising a conventional clock display including minute and hour markings and minute and hour hands, the latter being permanently connected with a digital clock display in order to have the digital display corresponding to the conventional clock settings.

U.S. Pat. No. 3,364,599 (Polsky) deals with a device similar to the above mentioned patent except it also conveys the time in writing.

U.S. Pat. No. 4,015,346 (Dgasawara) discloses analogue and digital simulated clocks, mechanically interlocked so as to have a digital time value correspond with a specific setting of the analogue clock display.

U.S. Pat. No. 4,102,060 (Berry) is concerned with a time teaching aid wherein hour and minute hands are fixedly connected with digital display means.

It is believed that none of the above references disclose or anticipate the instant invention. In fact, the present time teaching device provides the learner with a psychological and pedagogical challenge rather than with ready made answers found in other teaching aids, and it is believed that the concept of time display is more memorably conveyed.

SUMMARY OF THE INVENTION

A time teaching device is provided having a front portion comprising a simulated analogue clock comprising a face having horological divisions, an hour hand and a minute hand; and a simulated digital clock comprising a numerical hour display and a numerical minute display. The hour and minute hands as well as the hour and minute displays are independently movable, i.e. the minute and hour hands may be moved to any desired setting of time without affecting the minute or hour display of the digital clock, or vice versa. More specifically, a teacher, for instance may proceed with indicating a specific time of the day on the analogue clock, leaving it up to the pupil(s) to move the hour and minute displays of the digital clock in such a fashion so as to coincide with the analogue clock's time value, vice versa.

It is therefore one object of this invention to provide an improved means for teaching the manner in which time is indicated by an analogue clock.

It is another object of this invention to provide means for teaching the readings of time as displayed by a digital clock.

It is a further object of this invention to teach the convertibility of digital clock display into analogue clock meanings and vice versa.

It is still another object of this invention to provide persons with a time indicating device that will stimulate, entertain and hold the attention of the users.

It is a still further object of this invention to provide means for achieving the above objectives in a simple, readily understood and inexpensive manner.

The above mentioned objects and features of this invention will become more apparent by the following description of certain embodiments of the invention and the accompanying drawings.

DESCRIPTION OF THE PREFERRED EMBODIMENT

Figure 1:
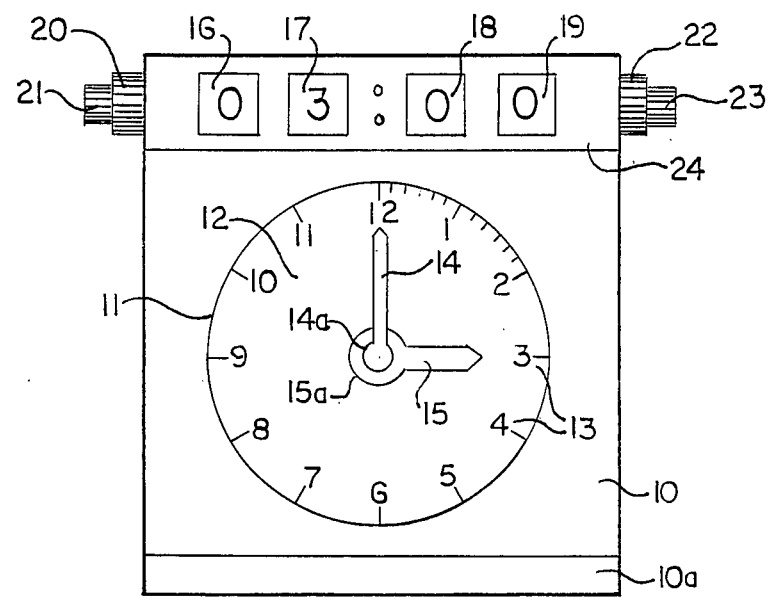
FIG. 1 is a front elevational view of one embodiment of this invention.
Figure 2:
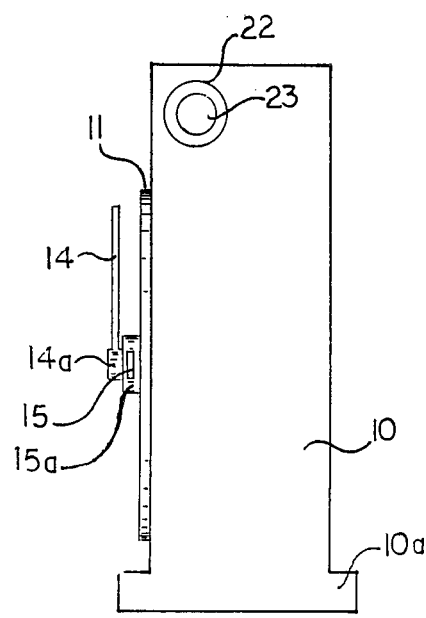
FIG. 2 is a side elevational view of the item disclosed in FIG. 1.
Figure 3:
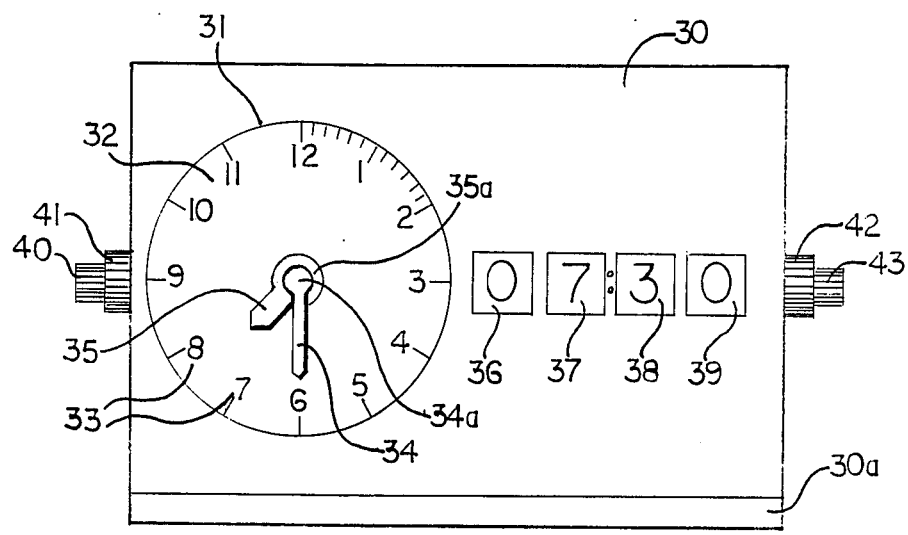
FIG. 3 is a front elevated view of an alternate embodiment of this invention.

Referring to the drawings, in FIG. 1 the front of a device 10 of this invention wherein item 10a devotes an optional base; to the face is attached simulated analogue clock 11 comprising clock face 12 having a plurality of radially spaced numerals 13 indicating the hours of the day as well as minute divisions therebetween; an hour hand 15 and a minute hand 14 are centrally and independently rotatably affixed to the clock face attached to bases 15a and 14a, respectively. Above the analogue clock the front also carries the simulated digital clock arrangement 24 displaying hour values 16 and 17 as well as minute values 18 and 19, the hour values may be changed by rotating knob 20 and/or 21, and the minute values may be change by turning knobs 22 and/or 23. Another illustration of a device of this invention is depicted in FIG. 3 wherein simulated conventional clock 31 and a simulated digital clock 45 are arranged side by side wherein minute hand 34 and hour hand 35 are both rotatably mounted in the center of clock face 32; whereas the hour values of digital clock may be changed by turning knobs 40 and/or 41 four hours values, and the minute values may be changed by turning knobs 42 and/or 43.

Figure 4:
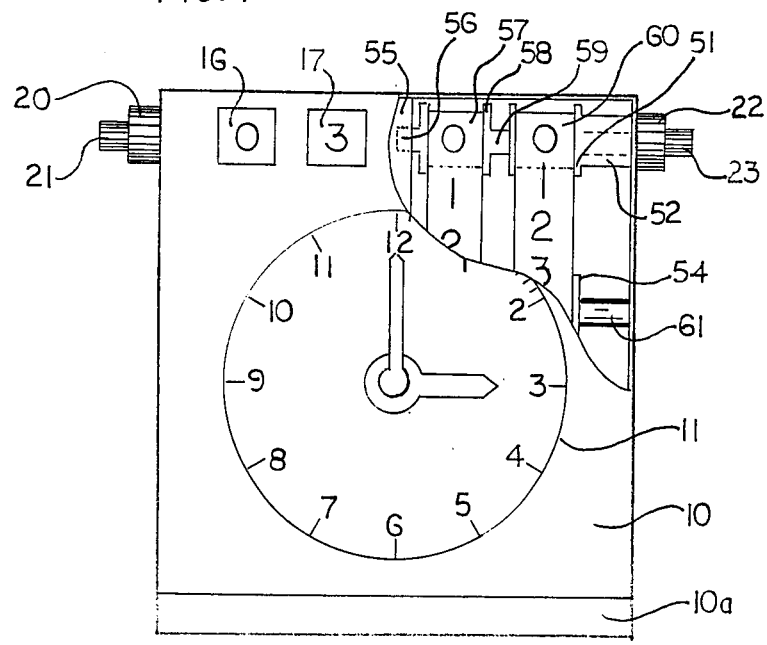
FIG. 4 is a front elevational view of an embodiment of this invention wherein a portion of the front cover has been removed.
Figure 1:
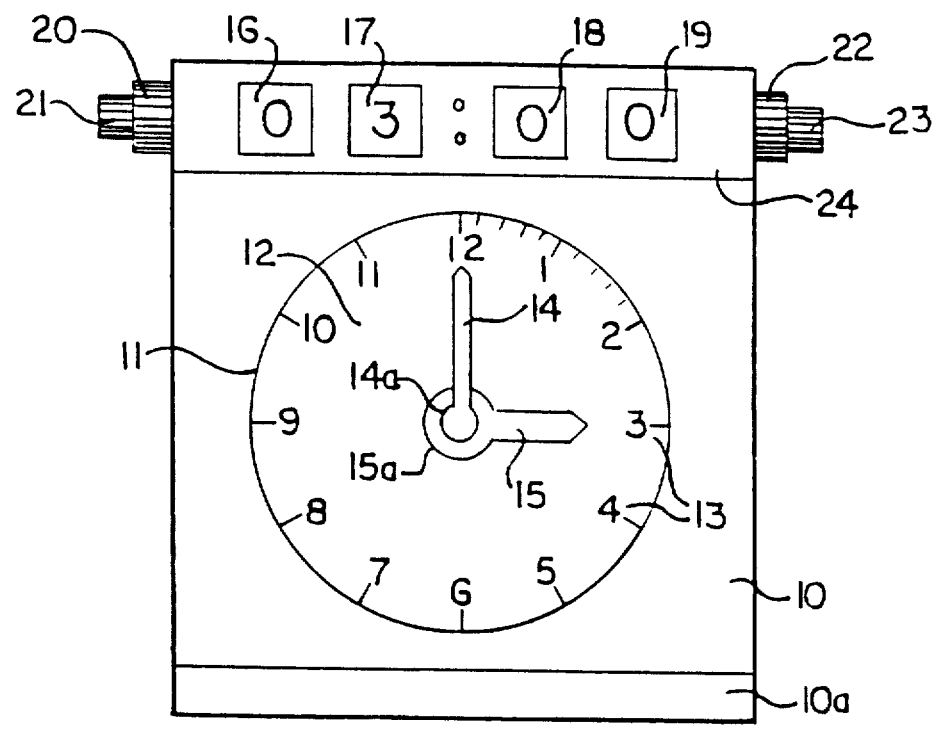
Figure 3:
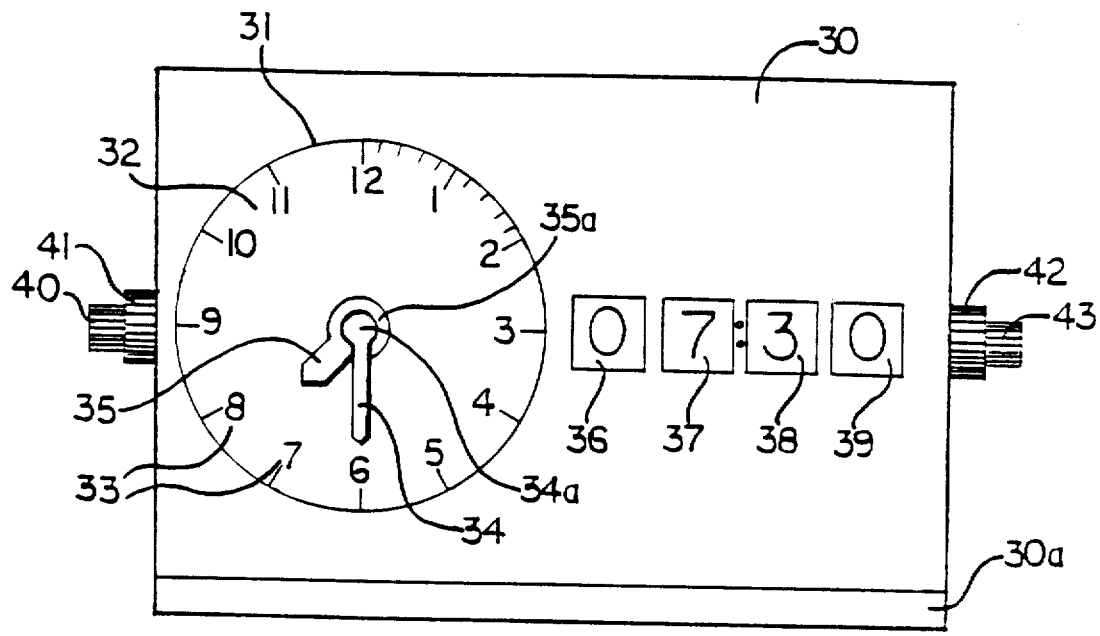
Figure 4:
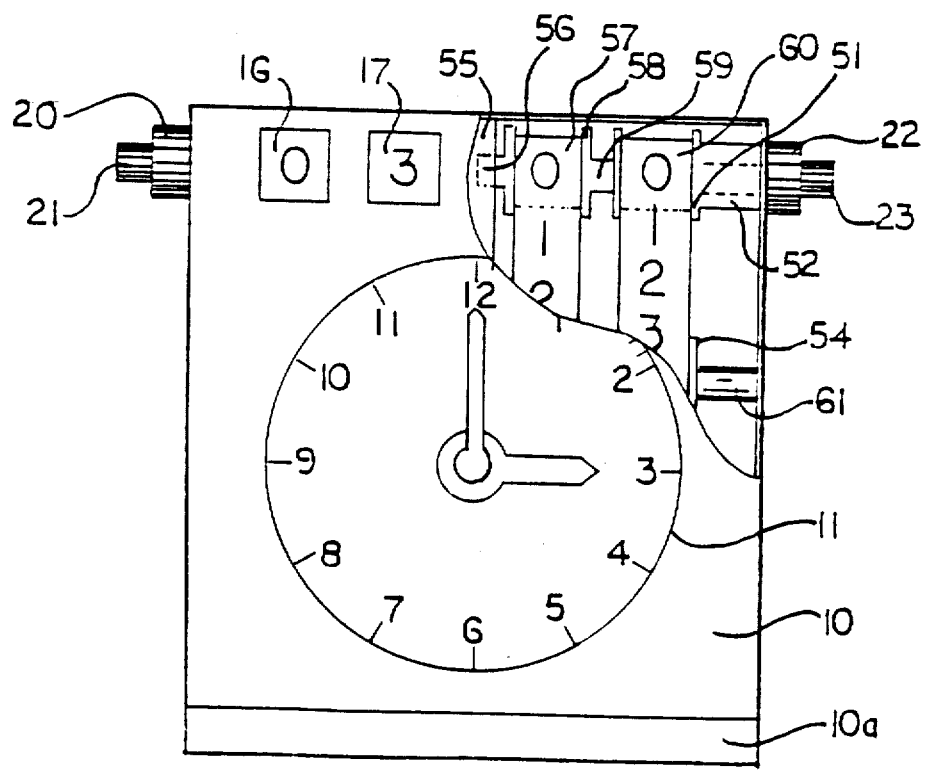

FIG. 4 shows a front elevated view such as of FIG. 1, however, a portion of the front plate 10 has been removed illustrating a possible arrangement for moving or changing the digital values for a given time, namely, a knob 22, outer shaft 52 and carrying roll 51 provide means for moving digital band 60 having imprinted thereon single minute integers reading from 0 to 9; said band 60 also forming a loop around secondary roll 54 rotatably mounted on shaft 61; similarly, knob 23, inner shaft 59 and carrying roll 58 provide means for moving digital band 57 having imprinted thereon integers reading from 0 to 6, said band 57 forming a loop also around a secondary roll (not shown) which is also rotatably situated on stationary shaft 61; inner shaft 59 is rotatably resting within outer shaft 52 on one end and on the other end in recess 56 of center part 55; a similar arragement for hourly digital values 16 and 17 by turning knobs 20 and 21, respectively, can clearly be envisioned, for that matter, the means of indicating the digital time values is not critical provided they may be operated independently from the simulated analogue clock 11 (the latter having been described above); minor structural details such as restrictive or locking-in means, and the like for the digital clock assembly members have been omitted for reasons of simplicity and clarity.

The materials of construction for the device of this invention are not critical and may be chosen from wood, metal such as sheet metal, or preferably from plastics such as polystyrene, polyethylene, polypropylene and the like, or a combination of such materials.

Although the Figures disclose Arabic numbering for the analogue clock, Roman or other numerals may be used instead. In addition and optionally, provisions may be incorporated indicating AM and PM meanings, or the digital clock may be equipped with markings from 1 to 24 hours.

Furthermore, there may be other means for changing time values for the simulated digital clock such as rolls or serrated discs and the like having appropriate numbers inscribed thereon.

Although the principle features of the improved educational device for teaching the meanings of the analogue versus digital clocks have been disclosed, it should be understood that the description of this invention ought not be construed as a limitation but as example, and such description should not be interpreted as limitation of the scope of the claims.

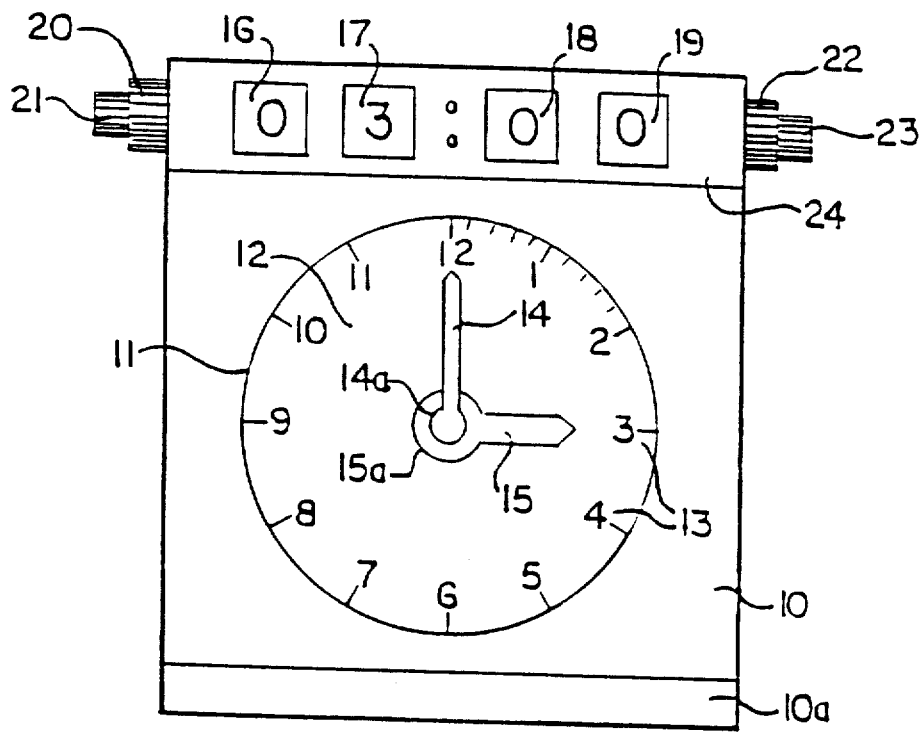

What is claimed is:

1. A device for teaching how to read time values indicated by an analogue clock and by a digital clock and how to convert analogue clock values into digital clock values, or vice versa; said device being a housing having a front portion equipped with a simulated analogue clock and a simulated digital clock, each clock being independently controllable, and wherein said analogue clock comprises a face having a plurality of radially spaced numerals representing hours of the day and minute divisions therebetween, a centrally and rotatably affixed hour hand and a centrally and rotatably affixed minute hand, said hour hand and said minute hand being rotatable independently from each other; and wherein said digital clock comprises a plurality of numerals representing the hours of the day and numerals representing minute values imprinted on individual bands, said bands forming loops around upper and lower rolls, said upper rolls being rotatable and affixed to shafts connected to knobs which are located outside said housing and are rotatable independently from each other, the lower rolls being rotatably mounted on shafts.

* * * * *

UNITED STATES PATENT AND TRADEMARK OFFICE
CERTIFICATE OF CORRECTION

PATENT NO. : 4,731,025

DATED : March 15, 1988

INVENTOR(S) : Frank J. Taylor

It is certified that error appears in the above-identified patent and that said Letters Patent is hereby corrected as shown below:

The title page should be deleted to appear as per attached title page.

In the drawings, Figs. 1, 3 and 4, four one minute markings should appear between 12-1, 1-2, etc., to total 60 markings per hour.

Signed and Sealed this

Ninth Day of August, 1988

Attest:

DONALD J. QUIGG

Attesting Officer

Commissioner of Patents and Trademarks

United States Patent [19]

Taylor

[11] Patent Number: 4,731,025

[45] Date of Patent: Mar. 15, 1988

[54] TIME TEACHING DEVICE

[76] Inventor: Frank J. Taylor, 1132 N. Paseo DeGolf, Green Valley, Ariz. 85614

[21] Appl. No.: 886,609

[22] Filed: Jul. 18, 1986

[51] Int. Cl.⁴ .................................................. G09B 19/12
[52] U.S. Cl. ............................................................ 434/304
[58] Field of Search ............................ 434/204, 304, 198

[56] References Cited

U.S. PATENT DOCUMENTS

| | | | |
|---|---|---|---|
| 3,022,582 | 2/1962 | Pitt | 434/304 |
| 3,203,115 | 8/1965 | Friday | 434/304 |
| 3,364,599 | 1/1968 | Polsky | 434/304 |
| 3,696,531 | 10/1972 | Stewart | 434/198 |
| 3,735,500 | 5/1973 | Matsumoto | 434/342 |
| 4,015,346 | 4/1977 | Ogasawara | 434/304 |
| 4,102,060 | 7/1978 | Berry | 434/304 |

FOREIGN PATENT DOCUMENTS

| | | | |
|---|---|---|---|
| 598965 | 12/1925 | France | 434/304 |
| 1030464 | 5/1966 | United Kingdom | 434/304 |

Primary Examiner—John E. Murtagh
Assistant Examiner—Andrew Joseph Rudy
Attorney, Agent, or Firm—CTC & Associates

[57] ABSTRACT

This invention deals with a teaching means for reading time by providing simulated analogue and digital clocks wherein said clocks function independently from each other.

1 Claim, 4 Drawing Figures